United States Patent [19]

Armbruster et al.

[11] Patent Number: 5,652,781

[45] Date of Patent: Jul. 29, 1997

[54] INTENSIFYING X-RAY FILM CASSETTE

[75] Inventors: Randy Eugene Armbruster, Rochester; Steven A. Lamy, Hamlin; Raymond P. Chapman, Fairport; Jeffrey C. Robertson; William Carl Wendlandt, both of Rochester; Dennis J. O'Dea, Farmington; Bradley S. Bush, Hilton, all of N.Y.

[73] Assignee: Eastman Kodak Company, Rochester, N.Y.

[21] Appl. No.: 637,143

[22] Filed: Apr. 24, 1996

[51] Int. Cl.$^6$ .................................. G03B 42/04
[52] U.S. Cl. .................. 378/182; 378/187; 378/188
[58] Field of Search .......................... 378/182, 187, 378/188, 169, 172, 175, 183, 167

[56] References Cited

U.S. PATENT DOCUMENTS

| | | | |
|---|---|---|---|
| 1,213,208 | 1/1917 | Kelley. | |
| 1,507,727 | 9/1924 | Buck. | |
| 1,997,557 | 4/1935 | Buck. | |
| 2,193,021 | 3/1940 | Dietz | 250/68 |
| 2,213,437 | 9/1940 | Wolf | 250/68 |
| 2,459,528 | 1/1949 | Hook | 250/5 C |
| 3,135,864 | 6/1964 | Sano | 250/68 |
| 3,153,145 | 10/1964 | Yerkovich | 250/68 |
| 3,157,787 | 11/1964 | Kendziorski, Jr. et al. | 250/68 |
| 3,504,180 | 3/1970 | Tone | 250/68 |
| 3,511,990 | 5/1970 | Hauss | 250/68 |
| 3,958,125 | 5/1976 | Zechmair et al. | 250/480 |
| 4,032,790 | 6/1977 | Nakamura | 250/480 |
| 4,059,768 | 11/1977 | Van Landeghem et al. | 250/483 |
| 4,081,686 | 3/1978 | Nieuweboer | 250/480 |
| 4,110,624 | 8/1978 | Conteas | 250/481 |
| 4,157,474 | 6/1979 | Koontz et al. | 250/480 |
| 4,166,958 | 9/1979 | Haselbarth | 250/480 |
| 4,380,087 | 4/1983 | Tanaka | 378/186 |
| 4,386,431 | 5/1983 | Van Landeghem et al. | 378/187 |
| 4,434,501 | 2/1984 | Pfeiffer | 378/187 |
| 4,467,919 | 8/1984 | Bengtsson et al. | 206/455 |
| 4,538,294 | 8/1985 | Tamura et al. | 378/187 |
| 4,589,125 | 5/1986 | Schmidt | 378/187 |
| 4,637,043 | 1/1987 | Bauer | 378/188 |
| 4,681,227 | 7/1987 | Tamura et al. | 206/455 |
| 4,712,228 | 12/1987 | Johnson et al. | 378/185 |
| 4,951,305 | 8/1990 | Moore et al. | 378/147 |
| 4,951,306 | 8/1990 | Keene, Jr. et al. | 378/187 |
| 5,008,920 | 4/1991 | Gralak | 378/185 |
| 5,025,465 | 6/1991 | Bauer et al. | 378/169 |
| 5,146,484 | 9/1992 | Trumpp | 378/188 |
| 5,265,148 | 11/1993 | Bauer et al. | 378/182 |
| 5,388,140 | 2/1995 | Robertson | 378/187 |
| 5,448,615 | 9/1995 | Robertson | 378/182 |

FOREIGN PATENT DOCUMENTS

| | | | |
|---|---|---|---|
| 0617685 | 8/1935 | Germany | 378/182 |
| 3535 981 A | 9/1985 | Germany. | |

*Primary Examiner*—Don Wong
*Attorney, Agent, or Firm*—James D. Leimbach

[57] ABSTRACT

A x-ray fill cassette for use with radiographic film. The cassette has a tube side unit and a cover unit. The units together define a film space for the film. The units are relatively pivotable between an open state and a closed state. The tube side unit is substantially convex in at least one of length and width dimensions when the traits are in the open state. The tube side unit is substantially flat in both length and width dimensions when the film is in the film space and the units are in the closed state. The tube side unit includes a compressible pad that adjoins the fill space. The cover unit includes a cover panel, a pressure panel, and an intensifying screen. The cover panel and the pressure panel are rigidly mounted in spaced parallel relation. The intensifying screen is adhered directly to the pressure panel adjoining the film space. The convexity of the tube side unit and the compressible pad are selected to impose on the film, when the film is in the closed state, a substantially uniform compressive force of from about 0.09 psi to about 0.35 psi.

17 Claims, 9 Drawing Sheets

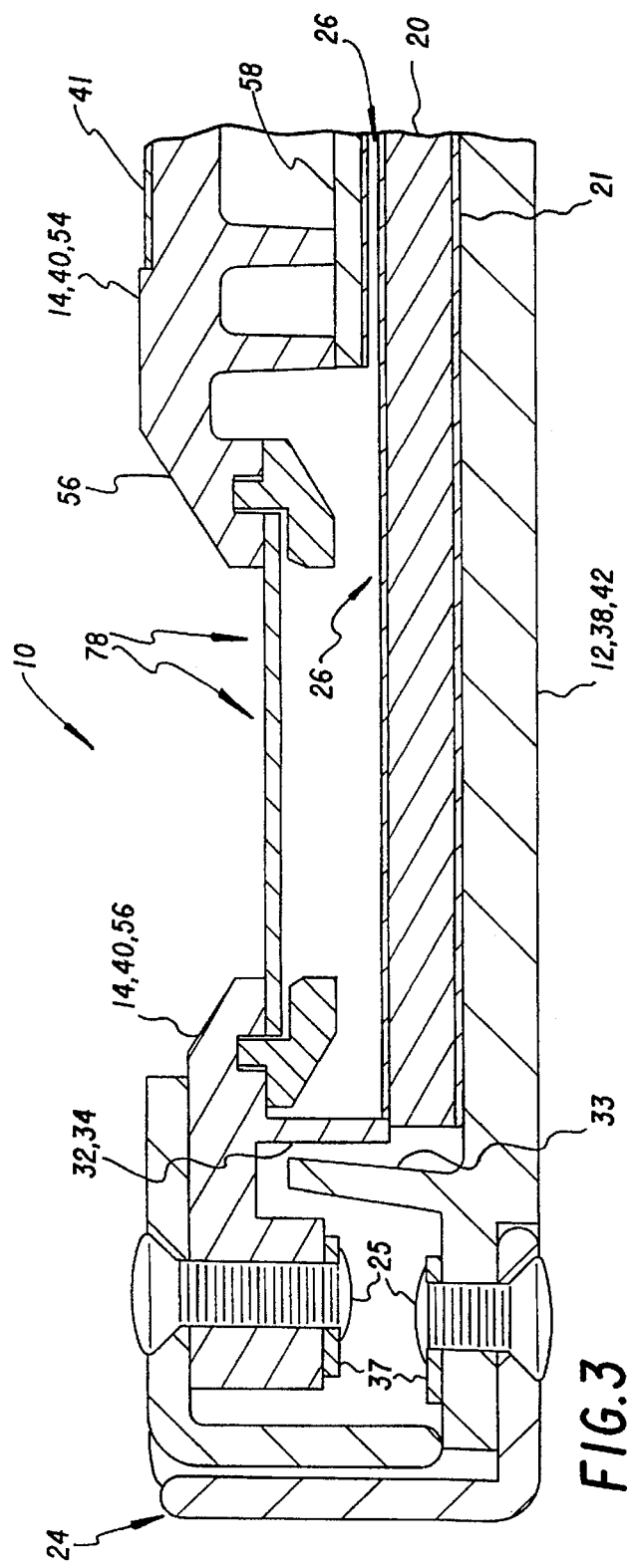
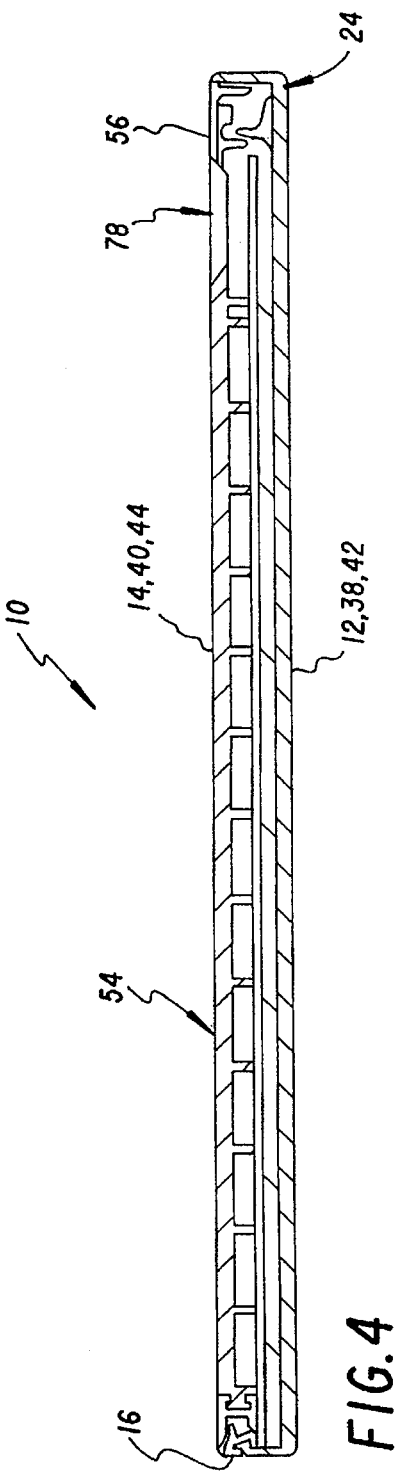
FIG. 3
FIG. 4

FIG.10
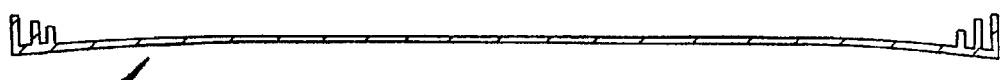
FIG.11
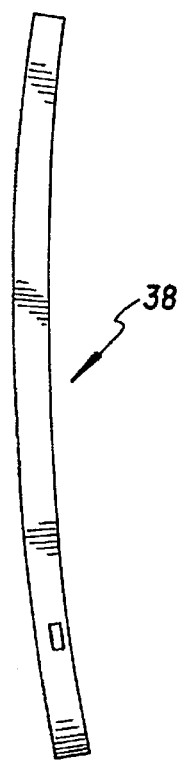
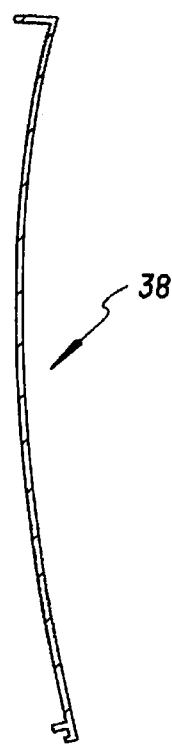
FIG.12    FIG.13

INTENSIFYING X-RAY FILM CASSETTE

FIELD OF THE INVENTION

The invention relates to radiography and to photographic film holders and more particularly relates to an intensifying x-ray film cassette.

BACKGROUND OF THE INVENTION

Intensifying x-ray film cassettes are widely used in radiography to hold light-sensitive film against a prompt emission phosphor screen, commonly referred to as an "intensifying screen." The cassettes are generally light tight to permit radiographic procedures to be carried out in normal room lighting. X-ray film cassettes are subject to a number of constraints. X-ray film cassettes must be both relatively light in weight and at the same time physically robust. X-ray film cassettes must be easy to load and unload. X-ray film cassettes must also support the formation of an image of good quality on the exposed film.

Imaging issues are of particular concern in areas like mammography where small differences in x-ray absorption must be visualized in surrounding soft tissue. This has lead to a differentiation of x-ray cassettes on the basis of the number of intensifying screens used in the cassette. In mammography and other specialty fields, x-ray cassettes are typically fitted with a single intensifying screen and the film used has light sensitive layers on one side only, in close proximity to the intensifying screen. In general radiography, x-ray cassettes are typically fitted with two intensifying screens; and an x-ray film with light sensitive layers on both sides is placed between the screens. In the general radiography cassette, both light sensitive layers receive light from both screens. The provides an increase in speed relative to a comparable cassette, but a relative decrease in resolution.

In x-ray film cassettes, the sharpness of the film image is also related to the separation of the light sensitive layers of the film and the luminescent layer of the intensifying screen. Close contact is commonly provided by pressing the film and screen against each other by means of a compressed resilient pad under each screen. In a typical general radiology cassette, internal contact pressures are up to about 0.12 psi. In a typical mammography cassette, internal contact pressures are up to about 0.09 psi. The difference in pressures is related to the different materials used for the tube side panels in the cassettes. The typical general radiography cassette has a tube side panel of 0.063 inch thick aluminum. This material is substantially transparent to x-rays at the wavelengths used in general radiography, short wavelength x-rays generated by an x-ray tube at an applied voltage of 80 to 100 kilovolts. In mammography, the applied x-ray tube voltage is approximately 27 kilovolts and relatively long wavelength x-radiation is produced. The aluminum tube side panel described above is too x-ray absorptive for use in a mammography cassette. Cassettes for mammography and the like commonly utilize polymeric tube side panels. A widely used material is polycarbonate. Carbon fiber-polymer composites are also used.

Mammography cassettes are commonly manufactured by forming or attaching cooperating labyrinthine light lock features at the perimeters of two panels, attaching one sidewall of each panel to a common hinge means, and providing latching means along the panel sidewalls opposite those attached to the hinge means. Typically, such cassettes contain a single prompt emission stimuable phosphor intensifying screens, to produce an acceptable image at relatively low patient exposure levels. The screen is normally affixed to the surface of a compressible pad, which, in turn, is affixed to the interior surface of one of the cassette panels.

U.S. Pat. No. 5,146,484 discloses a cassette having a continuous polymeric hinge affixed to one side. U.S. Pat. No. 4,467,919 and U.S. Pat. No. 4,637,043 disclose mammography cassettes having a film hinge on a thin wall and a light lock on three sides. A compression pad on the cover portion moves a film sheet toward the thin wall during closing of the cassette.

U.S. Pat. No. 4,681,227 discloses a storage phosphor (nonphotographic film) cassette having an embossed resin sheet overlaid on a cushion pad. U.S. Pat. No. 5,025,465 discloses a storage phosphor cassette having a similar "foil" applied on the surface of a pad.

A problem presented by previous cassettes is that, when manufactured, intensifying screens tend to have puckers or dimples or other flatness disturbances. In the manufacture of intensifying screens, several wet layers are coated on the surface of a flexible plastic web. Drying of the coatings results in shrinkage, which causes the coated web to curl significantly. This curliness is overcome by coating and drying layers with similar shrinkage characteristics on the back surface of the web. The resulting web, when cut into discreet sheets, on a macroscopic level, lays relatively flat, however, nonuniformities in the coated layers, and in the drying of the coatings, coupled with the high stress induced by the shrinkage of the coatings cause small localized disturbances in the flatness of the screen surface. These flatness disturbances tend to be very small, but are generally sufficient to degrade image quality of the resulting x-ray mammography film. Intensifying screens adhered to compressible pads tend to retain these flatness disturbances. On the other hand, intensifying screens adhered to hard panels tend to develop flatness disturbances if dust or debris is present between the screen and the panel.

The x-ray film cassette must be capable of withstanding internal pressures present in the closed cassette and the external pressure applied to close the cassette, without film-screen separation, or cassette distortion or break-down. Especially in mammography, intimate contact between the light sensitive layers of the film and the intensifying screen is essential to produce the required sharpness in the image, and separations between the film and the screen as small as 0.0005 inches can seriously degrade the image quality. A number of past cassettes have pre-curved one or both panels, or an internal pressure plate, to ensure good film-screen contact and deter bulging of the closed cassette.

U.S. Pat. Nos. 4,081,686; 4,538,294; and 4,951,306 disclose cassettes having two differently curved panels.

U.S. Pat. No. 3,958,125 discloses a cassette having a convex curved, flexible cover panel and a substantially rigid lower panel.

U.S. Pat. No. 4,032,790 discloses a cassette having one panel curved in two directions and other panel flat. A cushion pad is attached to one panel. U.S. Pat. No. 4,538,294 comments on a shortcoming of the cassette disclosed in U.S. Pat. No. 4,032,790:

"The back plate 54 is usually formed of an aluminum plate. It is difficult, however, to process an aluminum plate into a three-dimensional curved surface having elliptic contour lines. Since the intensifying screens 58 are rigid, they cannot easily be bent in conformity with the three-dimensional curved surfaces. Thus, it is hard to bring the X-ray film 62 uniformly into contact with the intensifying screens 58 on the back plate 54. Also in this cassettte 50, the joining of the front plate 52 and the curved back plate 54 requires great force." (U.S. Pat. No. 4,538,294, col. 2, lines 42–51)

U.S. Pat. No. 4,538,294 provides panels each beating a curved cushion member. Curvatures of the cushion members are at right angles.

A film cassette having a pre-curved polycarbonate bottom panel and a precurved pressure plate is disclosed in U.S. Pat. No. 5,388,140. Precurvature is determined by finite element analysis techniques based on loading forces on the closed cassette. An intensifying screen is adhered to the pressure plate and a compressible pad is adhered to the bottom panel.

U.S. Pat. No. 5,265,148 discloses a mammography cassette having a curved lower panel, an upper panel including a plate bonded to reinforcing webs, light lock structures on three sides and a hinge on the fourth, thin side.

Many current cassettes tend to entrap of air between the film and the screen when the cassette is closed. This causes one or more areas of poor contact between the screen and film. For many cassettes, as time passes, the contact pressure exerted by the compressed foam pad displaces much of the entrapped air, however, it is desirable to minimize the time required for air purging.

U.S. Pat. No. 4,386,431 discloses a magnetic-plate-type cassette having an intensifying screen with a protective layer having a surface roughness of 10 to 60 micrometers. The roughness allows outward air flow from between a sheet of film and the screen. The roughness is provided by embossing or using particles in the range of from 15 to 60 micrometers. Both walls of the cassette and the magnetic plate have a slightly cylindrical pre-bend when the cassette is open. The convex sides of the bends face toward one another. A steel plate opposite the magnetic plate is approximately flat.

U.S. Pat. No. 4,166,958 discloses a cassette including a cushion pad having air channels for air release.

U.S. Pat. No. 4,059,768 discloses the use of solid particulates in the protective layer of an intensifying screen. The protective layer has a static friction coefficient (μ) at 20° C. not higher than 0.50 on steel. The protective layer has a micro-unevenness in the range of at least 3 micrometers and preferably from 5 to 10 micrometers. The particles have a preferred average particle size of between about 5 and 25 micrometers. The thickness of the binder in the protective layer is adjusted to provide the desired micro-unevenness. For example, a protective layer with 8 micrometer beads has a thickness of 5 micrometers between beads.

It would thus be desirable to provide an improved film cassette that has a high internal pressure, but does not have the complexity of two precurved panels.

It would thus be desirable to provide an improved film cassette that has a rapid air purge rate.

It would thus be desirable to provide an improved film cassette that has a substantially uniform and relatively small screen-film separation.

It would thus be desirable to provide an improved film cassette that is simple to use.

It would further be desirable to combine all these features.

SUMMARY OF THE INVENTION

The invention is defined by the claims. The invention, in its broader aspects, provides an improved x-ray film cassette for use with radiographic film.

The cassette has a tube side unit and a cover unit. The units together define a film space for the film. The units are relatively pivotable between an open state and a closed state. The tube side unit is substantially convex in at least one of length and width dimensions when the units are in the open state. The tube side unit is substantially flat in both length and width dimensions when the film is in the film space and the units are in the closed state. The tube side unit includes a compressible pad that adjoins the film space. The cover unit includes a cover panel, a pressure panel, and an intensifying screen. The cover panel and the pressure panel are rigidly mounted in spaced parallel relation. The intensifying screen is adhered directly to the pressure panel adjoining the fill space. The convexity of the tube side unit and the compressible pad are selected to impose on the fill, when the film is in the closed state, a substantially uniform compressive force of from about 0.09 psi to about 0.35 psi.

It is an advantageous effect of at least some of the embodiments of the invention that there is provided an improved film cassette that has a high internal pressure, but does not have the complexity of two precurved panels.

It is an advantageous effect of at least some of the embodiments of the invention that there is provided an improved film cassette that has a rapid air purge rate.

It is an advantageous effect of at least some of the embodiments of the invention that there is provided an improved film cassette that has a substantially uniform and relatively small screen-film separation.

It is an advantageous effect of at least some of the embodiments of the invention that there is provided an improved fill cassette that is simple to use.

It is an advantageous effect of at least some of the embodiments of the invention that there is provided an improved film cassette that combines all these features.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein:

FIG. 3 is a partial cross-sectional view taken substantially along line B—B in FIG. 1. The cassette is shown empty. For the sake of clarity, structures out of the plane of the cross-section are generally not shown in this figure.

FIG. 4 is a cross-sectional view taken substantially along line A—A in FIG. 1.

(FIGS. 9–16 also illustrate the same unit. Curvature of the unit is exaggerated in some of these figures for clarity.)

FIG. 9 is a top plan view of the tube side unit of FIG. 8.

FIG. 10 is a front elevational view of the tube side unit of FIG. 9. This view is indicated by line 10—10 in FIG. 9.

FIG. 11 is a cross-sectional view of the tube side unit of FIG. 9, taken substantially along line 11—11.

FIG. 12 is a side elevational view of the tube side unit of FIG. 9. This view is indicated by line 12—12 in FIG. 9.

FIG. 13 is a cross-sectional view of the tube side unit of FIG. 9, taken substantially along line 13—13.

FIG. 14 is a side elevational view of a tube side unit of a desired shape when in the loaded condition. (For clarity, FIGS. 14–16 are drawn as simplifications of the robe side unit of FIG. 9.)

FIG. 15 is a side elevational view of the tube side unit of FIG. 14 when a normal loading is applied in a direction opposite to that experienced by the pressure plate during normal use.

FIG. 16 is a side elevational view of the tube side unit of FIG. 14 formed in the configuration shown in solid lines subjected to a normal loading force.

DESCRIPTION OF PARTICULAR EMBODIMENTS

Figure 1:
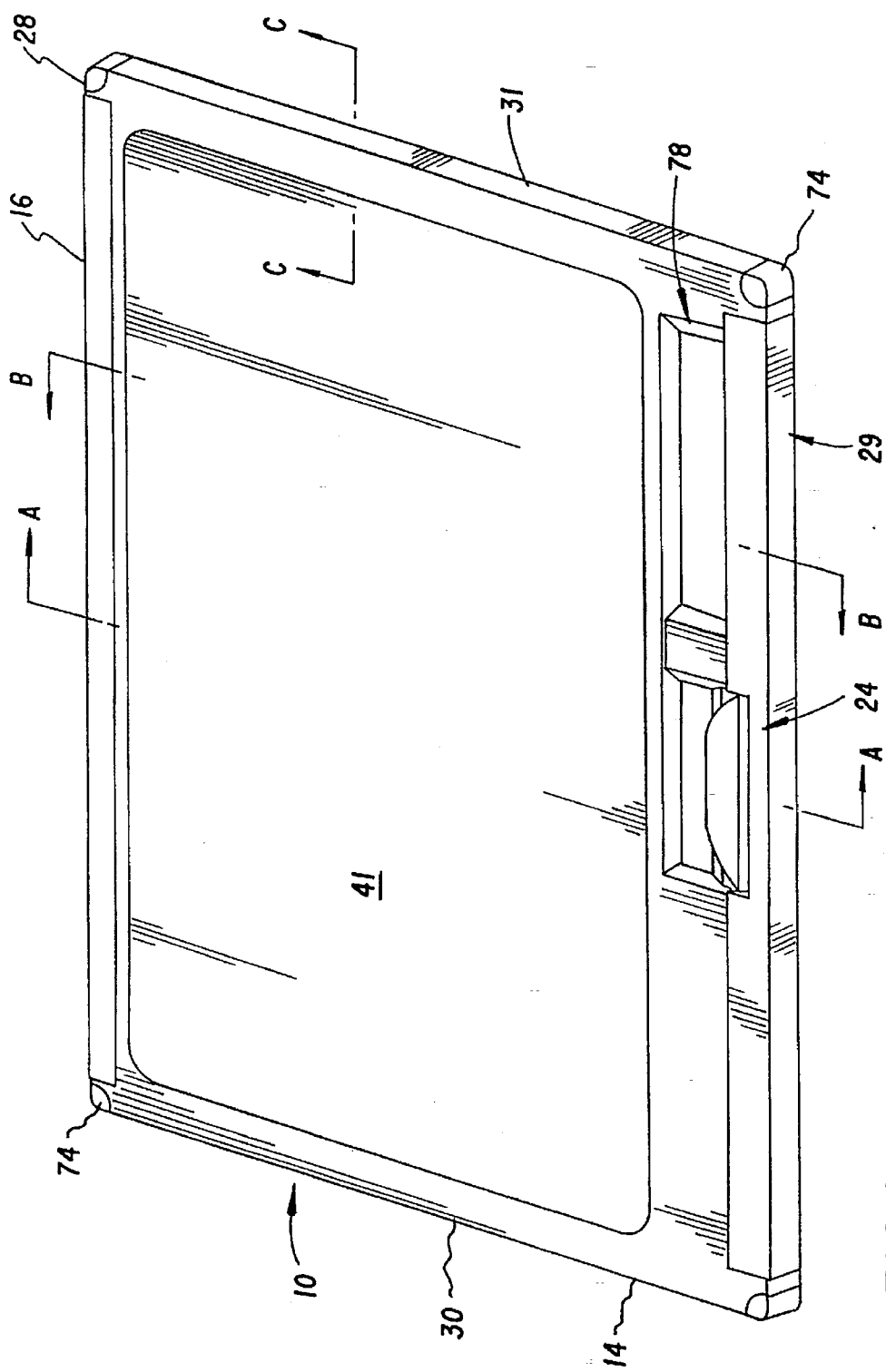
FIG. 1 is an isometric view of an embodiment of the x-ray cassette of the invention, showing the cassette in the closed state.

Improved film cassette 10 has a tube side unit 12 and a cover unit 14 joined to each other by a hinge 16. The cover unit 14 includes an intensifying screen 18. The tube side unit 12 includes a compressible pad 20. For use, a sheet of photographic film 22 is positioned between the screen 18 and the pad 20. The tube side and cover units 12,14 are pivotable about the axis of the hinge 16 between any of a number of open positions, one of which is shown in FIG. 2, (referred to generically herein as "open state") and a closed position or state, shown in FIG. 1. The cassette 10 has a latch mechanism 24 opposite the hinge 16. The latch mechanism 24 includes one or more separate latches. The latch mechanism 24 is actuable to retain the tube side and cover units 12,14 in the closed state and deactuable to permit relative pivoting of the tube side and cover units 12,14 to allow insertion of an unexposed x-ray film sheet 22, or removal of an exposed x-ray film sheet 22. The cassette 10 is hereafter referred to as a "loaded cassette 10" when the tube side and cover units 12,14 are in the closed state and a sheet of photographic film 22 is in a film space 26 defined between the units 12,14.

The tube side unit 12 and cover unit 14 are each roughly rectangular in outline and have first and second pairs of opposed sidewalls 28,29 and 30,31. (For each unit, the "first pair of sidewalls 28,29" here refers to the sidewalls bearing the hinge 16 and latch mechanism 24, respectively.) Sidewalls 29,30,31 of the tube side unit 12 are thick and include light lock elements 32. The fourth or contact sidewall 28 is thin. The sidewalls 29,30,31 of the cover unit 14 include light lock elements 33 that intermesh with the light lock elements 32 of the tube side unit 12 when the cassette 10 is in the closed position. In the embodiment shown in the figures, the light lock elements 32,33 have the form of interdigitated, vertically oriented walls or ribs. Innermost of the ribs are film space ribs 34 of the tube side unit 12 which adjoin the film space 26 defined between the cover unit 14 and tube side unit 12. Outermost are partial ribs 35,36 of the cover and tube side units 14,12; which together define the outer wall of the cassette 10 on three sides. The partial ribs are lapped and fit together when the cassette 10 is in the closed position.

The sidewalls 29 are cut back, exterior to the light lock elements 32,33; to accommodate the continuous latch mechanism 24. The two mating portions of the latch mechanism 24 can be attached to respective units 12,14 by rivets 25. The units 12, 14 can be locally thickened and backer plates 37 can be used to insure that the riveting operation does not crack the respective unit in the vicinity of the rivet holes.

In the embodiment of the invention shown in the figures, the tube side and cover units 12,14 each include a molding 38,40, respectively; which can be provided as a unitary single structure. Suitable moldings 38,40 can be provided of injection molded polycarbonate. The moldings 38,40 each include a central panel 42,44. The panels 42,44 are planar when the cassette is in the closed state. As shown in the figures, a decorative or abrasion resistant insert 41 can be inset within one or both panels 42,44.

The hinge 16 can have a variety of forms; however, it is preferred that hinge 16 be a "living" hinge 16 extending continuously along the contact walls 28. As shown in the figures, such a living hinge 16 is a one-piece plastic extrusion having a flexible portion 46 which bends to allow rotation of a first attachment portion 48, relative to a second attachment portion 50. A living hinge 16 can be held in place by adhesive or fasteners. This is not preferred; however, since it is difficult to provide a good bond by use of adhesive in view of the materials used and the fact that fasteners tend to localize stresses which can lead to tearing of the relatively soft material of the hinge. It is preferred that the contact sidewalls 28 of the cover unit 14 and tube side unit 12, be adapted to interlock with respective attachment portions 48,50 of the hinge 16. In the embodiment shown in the figures, the contact sidewall 28 of the cover unit 14 is recessed relative to the tube side unit 12 and has a laterally facing t-shaped rail or flange 49 that engages a complementary channel 51 in the second attachment portion 50. The contact sidewall 28 of the tube side unit 12 has an inwardly directed, roughly triangular flange 52 that engages a complementary channel 53 in the first attachment portion 48. A particularly suitable living hinge 16 is disclosed in U.S. Pat. No. 5,146,484.

The improved film cassette 10 imposes a substantially uniform compressive force of from about 0.09 psi to about 0.35 psi, or preferably about 0.20 psi, on a film sheet 22 disposed within the film space 26 of the closed cassette. This pressure is high relative to other radio graphic cassettes. To accommodate this high pressure, the improved film cassette 10 has a tube side unit 12 that is substantially convex in one or both of length and width dimensions when the cassette 10 is in the open state and a cover unit 14 that is substantially flat and rigid when the cassette 10 is in the open state. Both units 12,14; necessarily assume a flat shape when the cassette 10 in the closed state. The curved tube side unit 12 helps eliminate trapped air. Closing the cassette 10 causes the contact between the film 22 and the screen 18 to occur progressively, thus providing a continuous significantly open path for the air to escape ahead of an advancing line of contact.

Figure 14:
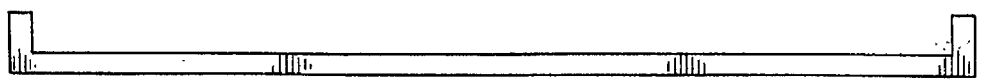
Figure 15:
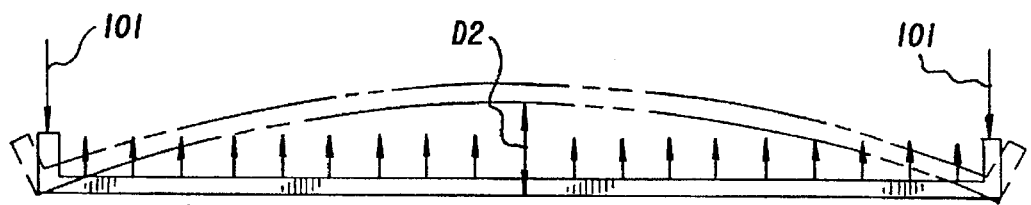
Figure 16:
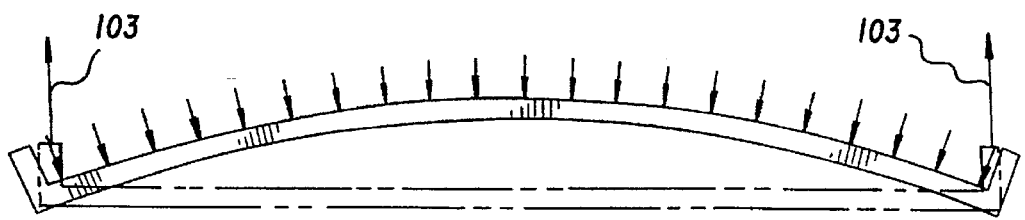

It has been determined that a tube side molding 38 curved by a modification of the technique utilized in U.S. Pat. No. 5,388,140 (for determining the curvature of both a tube side unit and a pressure plate) can provide a suitable curvature for a curved tube side unit 12 used with a flat, rigid cover unit 14. Referring now generally to FIGS. 8–16 and to FIG. 8 in particular, there is illustrated the tube side molding 38 in the "as molded" configuration. The shape of the tube side molding 38 of the cassette 10 of the invention can be determined by first mathematically deriving a first model configuration as follows. An initial predetermined shape is set forth for a tube side molding of uniform thickness. This shape is substantially parallel to the shape of the cover unit, and thus is substantially flat, as illustrated in FIG. 14. A calculation is then made of a predetermined loading force applied to the tube side molding 38 in a direction opposite to the direction in which a loading force is normally applied to the to the tube side molding 38 during ordinary use of the closed cassette 10, as illustrated by arrows 101 in FIG. 15.

The resulting deflected configuration of the tube side molding 38 is compared with the initial predetermined shape and the difference is calculated. The amount of deflection D2 is added to the initial predetermined shape of FIG. 14, defining a new modified shape for the tube side molding 38, as shown by solid lines in FIG. 16. The modified shape is mathematically subjected to a loading force, for example, using finite element analysis techniques, in the direction in which a loading force is normally applied to the tube side molding 38 during ordinary use of the closed cassette 10, as shown by arrows 103 in FIG. 16. The resulting deflected configuration of the modified shape tube side molding 38 is compared with the initial predetermined shape, the difference is calculated, and the result is applied to the modified shape. The mathematical generation of a modified shape is repeated until the remaining difference is within tolerances required for a substantially uniform screen-film separation in the loaded cassette of less than about 12.5 micrometers. (The screen is assumed here to be perfectly flat and the screen and film are assumed to have perfectly uniform thicknesses.) Suitable "contact" tests of screen-film separation are in accordance with guidelines specified in the *American College of Radiology Mammography Quality Control Manual*.

In the preferred procedure just described, an initial loading force is applied to a mathematical model in a direction opposite the direction the force is experienced during normal use of the cassette. This is a preferred approach, since it results in a rapid determination of the final design; however, an initial loading force could be applied to the initial predetermined shape in a direction normally encountered by the base. The amount of deflection is then subtracted from the initial predetermined shape to define a new modified shape. This new modified shape is then subjected to normal loading forces and compared with the desired initial predetermined shape. If within tolerance, this new modified shape defines the molded fabricated shape of the tube side molding. If not within tolerances, the difference is added to or subtracted from the new modified shape to define a second modified shape. The modification procedure is then repeated until the resulting modified shape is within tolerances.

The first model configuration is then subjected to the same kind of mathematical techniques, but sequentially varying the thickness of the tube side molding 38. The thickness of tube side panel 42, within the area of the film space 26, is chosen to limit the overall curvature of the panel 42, to assure that sufficient rotation of cover unit 14 will occur when the cassette 10 is opened, to facilitate easy insertion and removal of the film 22. The thickness is also varied to ameliorate the shortcoming that a tube side molding 38, having a first model configuration with significant curvature in two orthogonal directions would tend to have a propensity to buckle, or "oil can". Such an approximately spherical curvature, would generate significant in-plane compressive stresses when flattened during closure of the cassette, leading to possible buckling failure and nonuniform pressures in the cassette. To compensate for the additional structural rigidity resulting from the light lock elements 32 and reduce the propensity of the tube side unit 12 to buckle, the thickness of the tube side molding 38 is reduced along the second pair of sidewalls 30,31. A further departure from the undesired "spherical" shape can also be provided by shortening the partial ribs 35,36 of the cover and tube side units to reduce a bending load when the cassette is in the closed state. Modifications of the mathematical model or an actual cassette can be repeated on an iterative basis until the differential in curvature between the sidewalls and the center of the tube side panel is reduced, resulting in a shape that is less "spherical", and more "cylindrical" in form. Since such a shape develops primarily bending stresses within the tube side panel 42, as the tube side molding 38 is flattened by closure of the cassette 10, in-plane compresslye stresses and any propensity of the tube side unit 12 to buckle are reduced or eliminated.

The cover unit 14, as indicated above, is rigid and flat. In the embodiment of the invention disclosed in the figures, these features are provided by a configuration in which the cover unit 14 has a torsion box portion 54 and a periphery 56. The periphery 56 includes the light lock elements 33 on three sides and the t-shaped rail 49 of the contact sidewall on the fourth side. The torsion box portion 54 thus has length and width dimensions substantially coextensive with the dimensions of the film space 26.

The torsion box portion 54 includes the cover center panel 44, a pressure panel 58, and a plurality of buttresses 60. The buttresses 60 rigidly hold the cover center panel 44 and pressure panel 58 in fixed parallel relation. The torsion box portion 54 has a rigidity greater than the summed rigidities of its individual components and is capable of resisting high internal cassette 10 pressures with minimal deformation. The thicknesses and rigidities of the panels 44,58; and number, distribution, shape, rigidity and other features of the buttresses 60; are selected so as to ensure that the pressure panel 58 remains rigid under the forces imposed during closing of the cassette 10. For example, the buttresses 60 can be provided as a grid, with buttresses 60 oriented both parallel and perpendicular to the sidewalls 29–31. The unitized components of the torsion box portion 54 are sufficiently rigid and inflexible for the torsion box unit 54 to function much as its name implies, as a torsion box, a torsion-resistant structure having a pair of thin, parallel load bearing skins joined together by spaced through-members. The cassette 10 is not, however, subject to major torsional loads in ordinary use. The torsion box portion 54 is subject to major bending loads in the cassette 10 of the invention, when the cassette is in its closed state. The torsion box portion 54 resists those loads without deleterious bending or twisting.

The buttresses 60 can be formed as part of the cover molding 40 (as shown in the figures) or as part of a combined pressure plate-buttress unit (not shown) or as a separate unit or units. The buttresses 60 can be fixed in place during manufacture of the cassette 10 by any appropriate means, for example, the components can be joined together by adhesive or by techniques such as ultrasonic or vibration welding. In the embodiment of the invention shown in the figures, the buttresses 60 are formed as a unitary part of the cover molding 40 and the pressure panel 58 is a substantially flat and rigid piece, cut to size from a sheet of extruded polycarbonate or other similar material.

In a preferred embodiment of the invention, the improved film cassette 10 provides an intensifying screen 18 that is very flat. The material from which the pressure panel 58 is manufactured is specially chosen to have a primary surface 62 (the surface of the pressure panel 58 facing the film space 26) which is substantially smooth and flat. The intensifying screen 18 is affixed to the primary surface 62 of the pressure panel 58 by a procedure which reduces or eliminates flatness disturbances commonly seen in unmounted intensifying screens (such flatness disturbances commonly have a size range of about 12.5 micrometers or greater). In a currently preferred procedure, the intensifying screen 18 is affixed to the primary surface 62 of the pressure panel 58 by adhesively laminating the entire area of the back surface of the intensifying screen 18 to the primary surface 62 of the pressure panel 58 with sufficient pressure to bond all areas of the screen 18 to the pressure panel 58. In a preferred embodiment of the invention, the adhesive layer has a thickness of from about 0.25 mm to about 0.50 mm. It has been determined that in this range of thicknesses, contaminant particles, such as airborne dust, lodging between the surface of the pressure panel 58 and the intensifying screen 18 during manufacture tend to become embedded within the adhesive. As a result, such embedded particles do not cause the intensifying screen 18 to protrude. In this embodiment, the surface of the intensifying screen 18 has a surface relief that is less than 12.5 micrometers per 1 centimeter area of the surface. These values apply to the entire surface of the intensifying screen 18.

The intensifying screen 18 includes a luminescent layer and, in a preferred embodiment of the invention, a beaded or matte protective layer (not illustrated). The beads or matting provide a network of microscopic air channels between the fill and the screen 18 when the cassette 10 is closed, and increase the rate of purging of air trapped between the film and screen 18 during closure. The size of the beads or matting should not be so large as to cause an unacceptable degradation in film image quality due to excessive screen-film separation.

It is currently preferred that the protective layer includes a polymeric matrix of substantially rigid beads dispersed in the matrix. The beads can be solid or hollow. The term "bead" is here inclusive of both substantially spherical or oval particles and particles of other, more complex shapes. Substantially spherical particles are currently preferred as being less likely to cause image degradation due to extensive light-scattering. If the beads are subject to sinkage into the matrix during manufacturing, then the beads should have a median diameter greater than the thickness of the matrix. Suitable materials for the beads include: crosslinked acrylate and methacrylate copolymers and homopolymers, such as poly-methylmethacrylate-co-ethyleneglycol dimethyacrylate and polyethyleneglycol dimethacrylate; and crosslinked styrenic copolymers and homopolymers, such as polystyrene-co-divinylbenzene, polyvinyltoluene-co-divinyl benzene and poly divinyl benzene. The degree of crosslinking is controlled to minimize shrinkage of the bead within the solvent used to coat the matrix.

The beads should be supplied in a suitable concentration to provide a continuous network of microchannels over the surface of the intensifying screen 18. Suitable concentrations are in the range of about 1 to about 10 weight percent relative to the weight of the matrix polymer of the protective layer. Convenient median diameters for beads are from about 5 micrometers to about 30 micrometers. Corresponding matrix median thicknesses are from about 3 micrometers to about 15 micrometers. Narrow bead size distributions are preferred. For example, 80 percent of beads within ±25 percent of the median diameter. It is similarly preferred that the coating thickness be substantially uniform; i.e., the coating thickness over the entire intensifying screen should not be so thin as to allow the beads to readily detach from the screen and should not be so thick that the beads are buried within the matrix.

The selection of beads for the protective layer is subject to competing considerations. It would be expected that resolution (generally described in the art as modulation transfer function or MTF) would degrade with an increase in median bead diameter, since increasing the space between the luminescent layer of the intensifying screen and the film causes image blurring. This result was seen experimentally. It was experimentally determined, on the other hand, that beads having too small a diameter provided unacceptably low air purge rates. It is not understood whether the slow air purge is a function of an inadequate formation of the network of microchannels between screen and film, or a function of air resistance in microchannels having at least one smaller dimension. In a preferred embodiments of the invention, the beads are solid and have a median diameter of from about 10 micrometers to about 20 micrometers, or more preferably have a median diameter of about 13 to about 17 micrometers, and the matrix has a median thickness of from about 3 micrometers to about 10 micrometers, or more preferably the matrix had a median thickness of from about 5 micrometers to about 8 micrometers. Air purge rates for these embodiments were good in that there was a substantially complete air purge from between the screen and film in a time range of from about 1 to about 5 minutes. The MTF values were in the range of 0.40 to 0.45 at 5 cycles per min.

A compressible pad 20 is adhered by an adhesive layer 21 or otherwise affixed to the center panel of the tube side unit 12 opposite the intensifying screen 18 within the film space 26. The pad 20 has a contact surface 64 that bears against the film 22 when the cassette 10 is loaded. The pad 20 includes a resilient portion 66 and, in a currently preferred embodiment of the invention, the contact surface comprises a slip-layer between the resilient portion 66 and the screen 18. The thickness and compressibility (stiffness) of the resilient portion 66 of the compressible pad 20 are chosen such that, when an x-ray film is placed on top of compressible pad 20, and cover unit 14 is closed against tube side unit 12, the resilient portion 66 is partially compressed, thus generating a pressure to urge film 22 into intimate contact with screen 18. It is currently preferred, to insure good film-screen contact and purging of any trapped air, that the pressure between the cover unit 14 and the tube side unit 12 be from about 0.15 psi to about 0.35 psi, and is more preferably about 0.20 psi. (A particular embodiment of the cassette 10 of the invention is necessarily limited to use with film having a thickness in a standardized and relatively narrow range.) Suitable features for the resilient portion 66 of the pad 20 are known to those of skill in the art or can be selected by simple trial and error based on materials used in the art for pads in cassettes.

The slip-layer 64 can be an integral part of the compressible pad 20 or can be attached to the resilient portion 66 in some manner, e.g., at the surface of the pad 20 or along the sidewalls. The pad 20 and screen 18 are positioned within the cassette 10 such that closure of the loaded cassette 10 causes the screen 18 to engage the film 22 and push the film 22 both against the pad 20 and in the direction of the contact wall 28 unless the film is already appropriately positioned. The compression of the film 22 against the pad 20 tends to resist movement of the film 22 in the direction of the contact wall 28. The movement of the film 22 is subject to both frictional resistance from contact between the film 22 and compressible pad 20 and resistance due to the propagation of a compression wave through the pad 20 as the film 22 is moved.) To overcome these factors, the slip-layer 64 is selected to have a low coefficient of friction relative to the film 22 and the compressibility of the resilient portion 66 of the pad 20 is selected so as to reduce the resistance created by the resilient portion 66 of the pad 20. A suitable coefficient of friction for the slip-layer 64, relative to a sheet of photographic film, is from about 0.1 to about 0.35. Suitable pad compressibilities coincide with pad compressibilities necessary to provide the internal pressures previously discussed. The resilient portion 66 of the pad 20 can be made of a single material having a uniform compressibility or can have layers or portions of differing compressibility (not shown).

In preferred embodiments of the invention, the coefficient of friction of the slip-layer 64 is from about 0.25 to about 0.35 relative to the film. In these embodiments, the coefficient of friction of the compressible pad 20 relative to the film is substantially the same as the coefficient of friction of the surface of the intensifying screen 18 relative to the film. This condition would be predicted to be problematic, since when a sheet of film is sandwiched between a first, stationary surface and a second, movable surface, the film will remain stationary relative to the surface with the higher coefficient of friction between the film and the adjacent surface. If the coefficients of friction of opposite sides are equal, then, absent other considerations, it is uncertain as to which pair of surfaces will slip, and which pair will not. Since the dynamic coefficient of friction is generally lower than the static coefficient of friction; once sliding has begun, it is likely that the slipping pair of surfaces will continue to slip.

In the invention, during loaded cassette 10 closure, contact of the screen 18 with the film 22 is substantially limited to the hinge-side margin until the cassette 10 is almost fully closed. This problem of film slippage is overcome in a preferred embodiment of the invention by the presence of a non-slip edge 68 on the margin of the intensifying screen 18 that adjoins the hinge 16 to ensure that the film 22 slips relative to the slip-layer 64 during cassette 10 closure. The non-slip edge 68 can be provided by a high coefficient of friction edge coating on the intensifying screen 18 or by use of a textured or other high friction configuration on the margin of the screen 18. In particular embodiments of the invention, suitable ranges for the coefficient of friction for an edge coating, relative to the film are in the range of about 0.2 to about 0.7. Suitable materials for such coatings include polyvinylethers, polyacrylates and methacrylates, and polystryrene and related styrenic polymers.

In a preferred embodiment of the invention, the hinge 16 is isolated from the pressure imposed on the cover unit 14 by the flange or stop flange 70 of the tube side unit 12. In this embodiment, the pressure panel 58 extends, in the direction of the contact sidewalls 28, beyond a last buttress 60a and under the stop flange 70. When the loaded cassette 10 is closed, pressure is imposed by most of the pressure panel 58 onto the buttresses 60, but by the contact wall end of the pressure panel 58 onto the stop flange. The flexible portion 46 of the hinge 16 is isolated from expansive forces in directions substantially perpendicular to the major dimensions of the film. The second attachment portion 50 of the hinge 16 can extend over the stop flange to provide a contact member between the stop flange and the pressure panel 58, that is replaceable along with the rest of the hinge 16.

Resilient corner pads 74 are mechanically interlocked with or adhered to complementary corners recesses 76 in the cover unit 14. The resilient corner pads 74 reduce the risk of mechanical damage if the cassette 10 is dropped or bumped.

Figure 2:
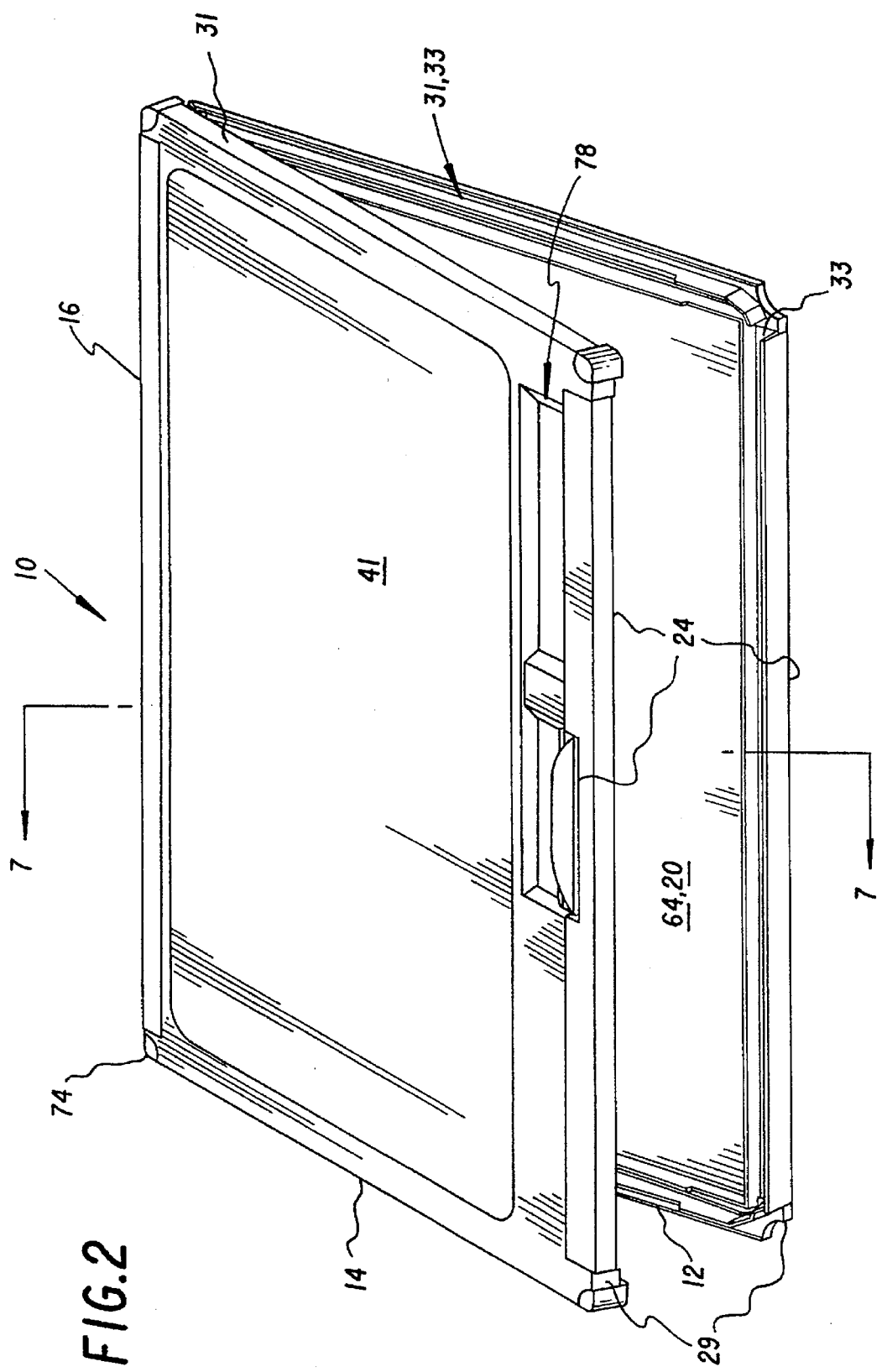
FIG. 2 is substantially the same view as FIG. 1, showing the cassette in an open state and empty of film.
Figure 5:
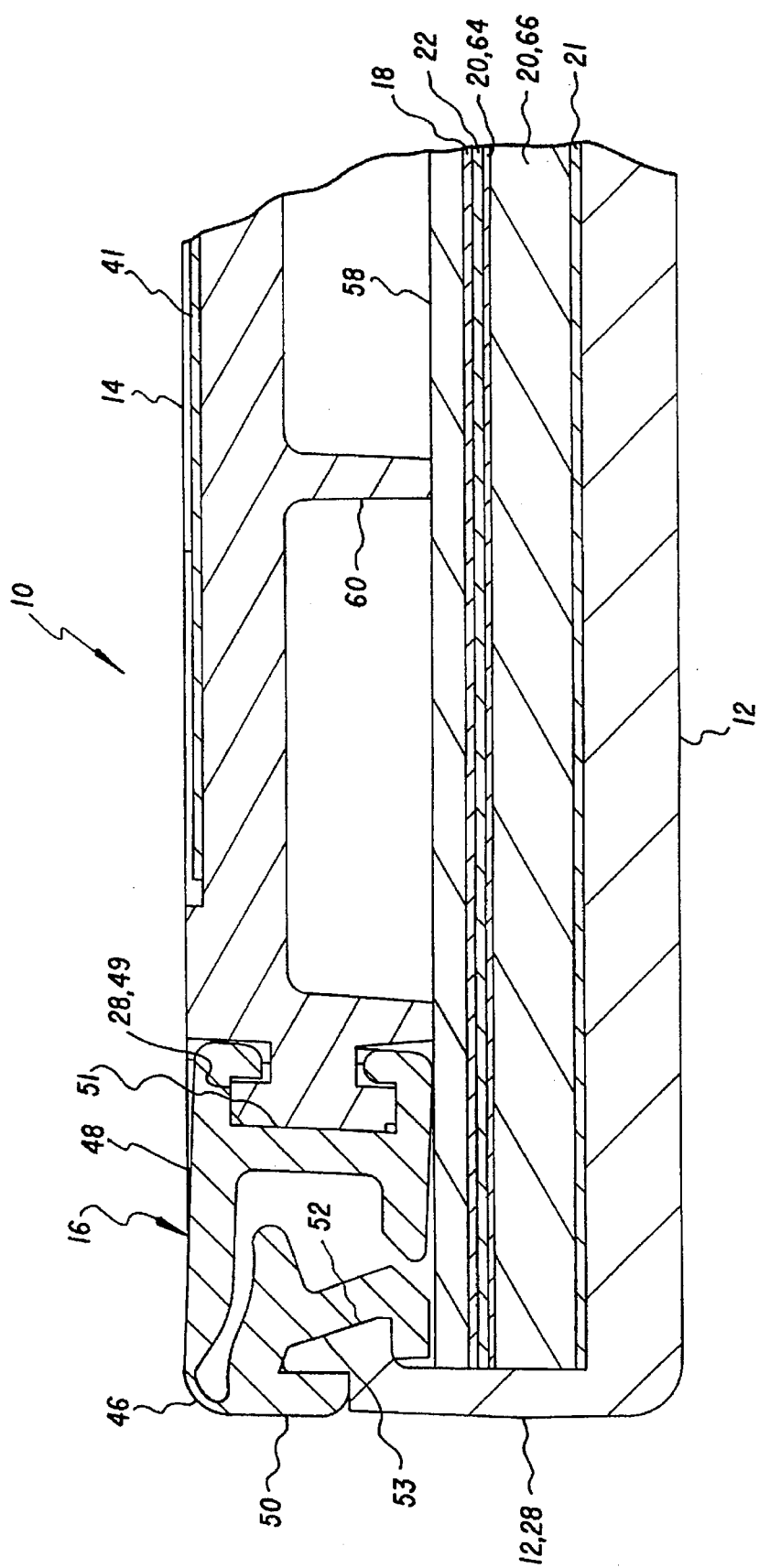
FIG. 5 is an enlarged partial cross-sectional view taken substantially along line A—A in FIG. 1.
Figure 6:
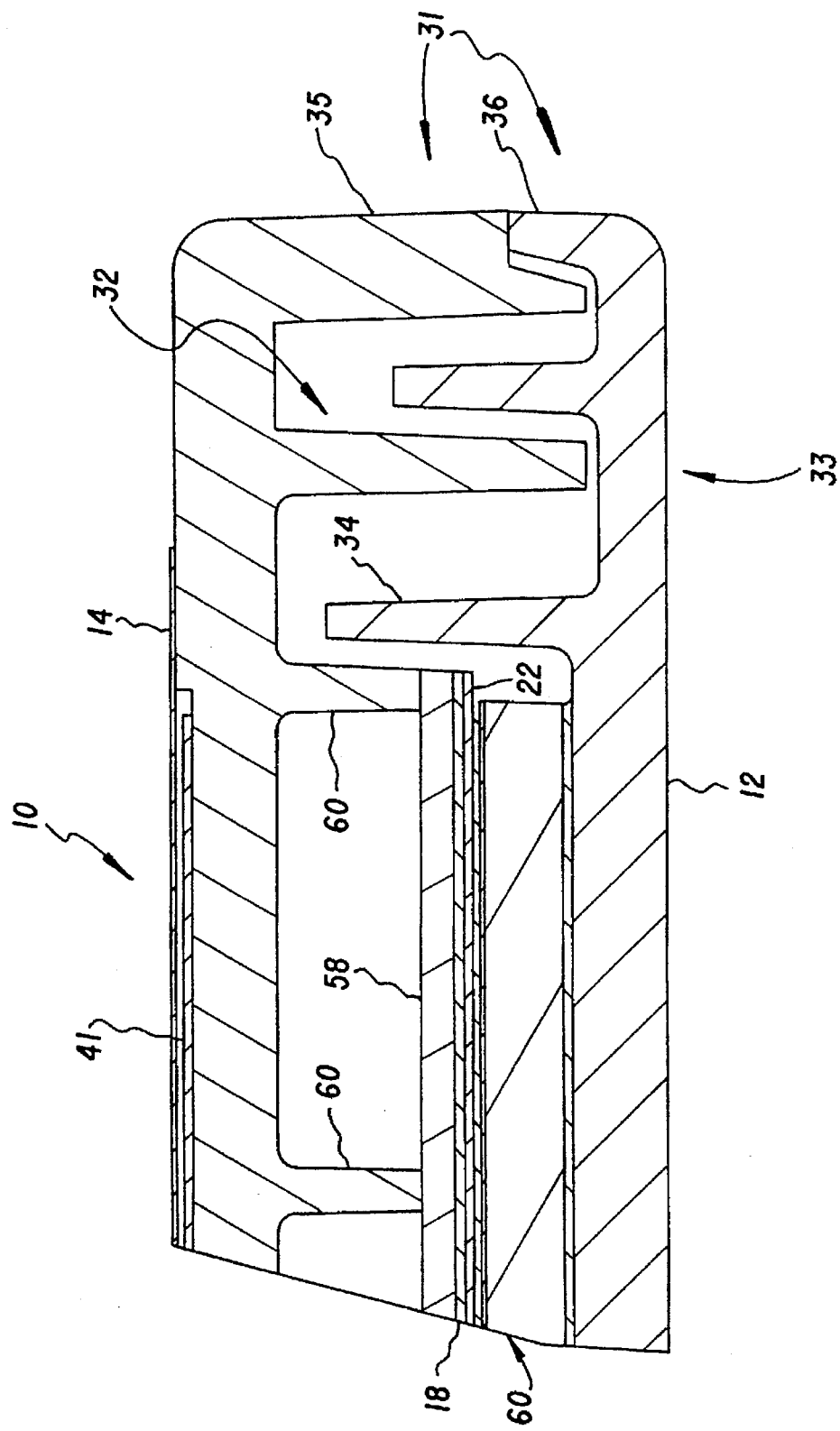
FIG. 6 is a partial cross-sectional view taken substantially along line C—C in FIG. 1.
Figure 7:
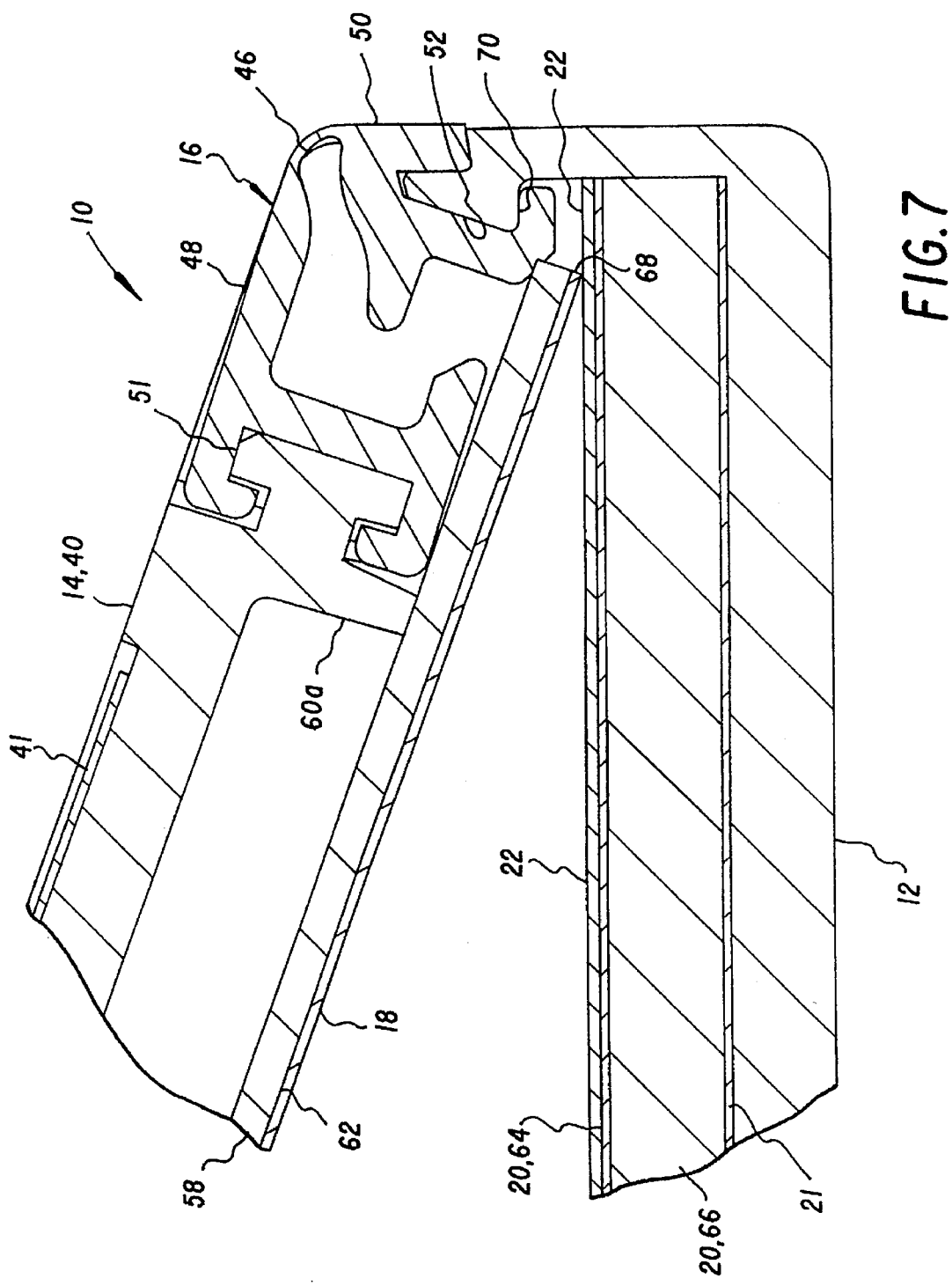
FIG. 7 is a partial cross section view taken substantially along line 7—7 in FIG. 2.
Figure 8:
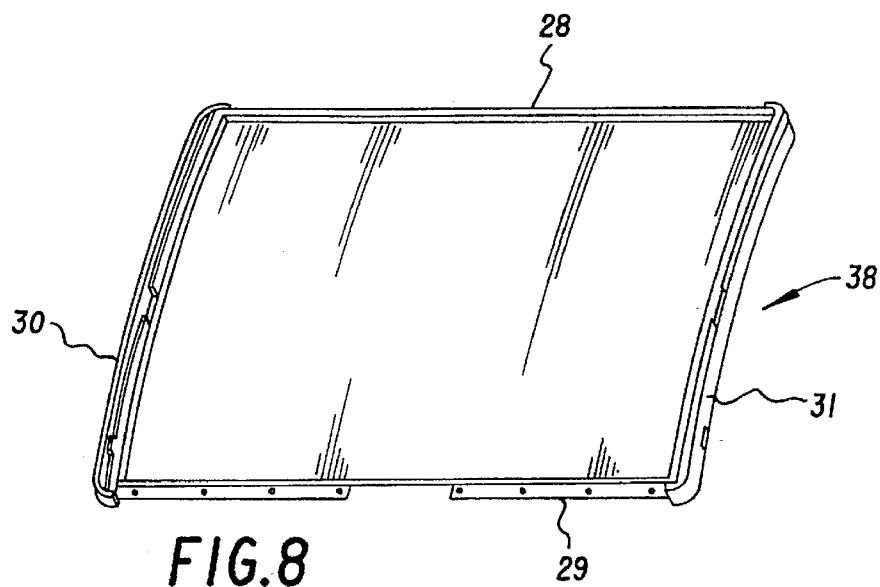
FIG. 8 is a perspective view of the tube side unit of the cassette of FIG. 1.
Figure 9:
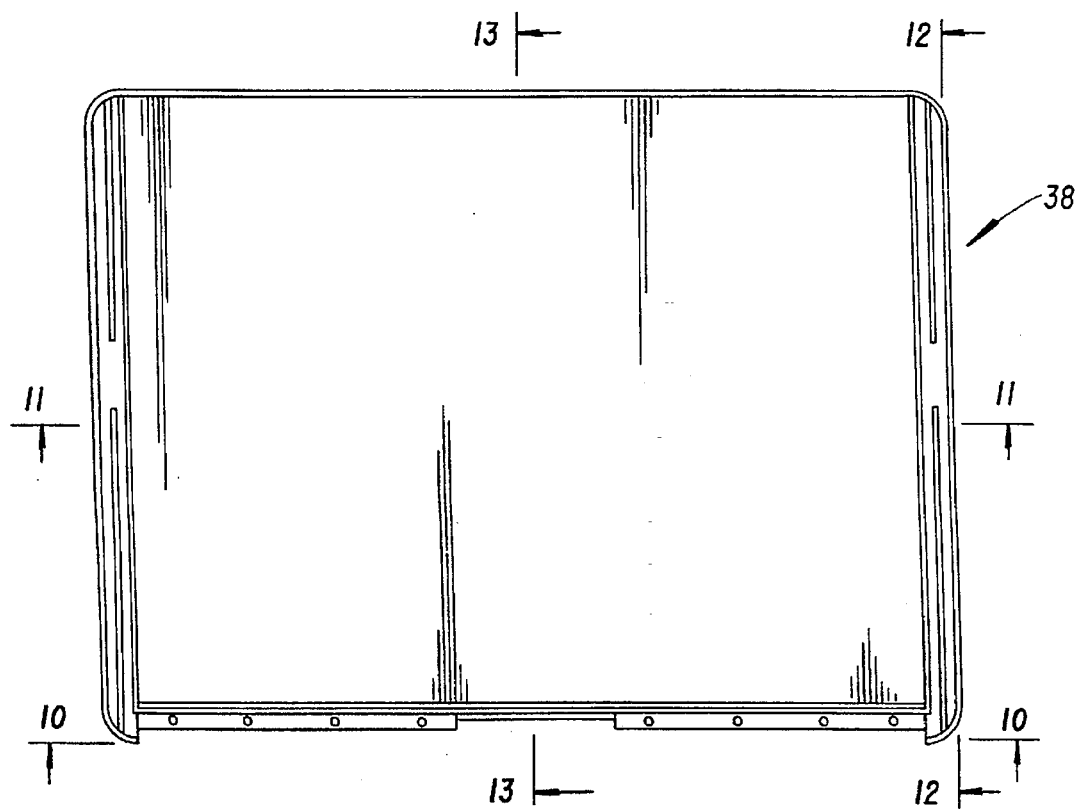

The improved x-ray cassette 10 can include a variety of other features used in prior cassettes such as a conventional patient identification window 78, as illustrated in FIGS. 1-3, and positive film separation mechanism (not shown). A patient identification window is disclosed, for example, in U.S. Pat. No. 5,448,615. Positive film separation mechanisms are disclosed, for example, in U.S. Pat. Nos. 3,511,990; and 4,712,228.

The following Examples and Comparative Examples are presented to further illustrate and elucidate some preferred modes of practice of the invention. Unless otherwise indicated, all starting materials were commercially obtained.

Examples 1–4

Film cassettes were prepared substantially as indicated in the preferred embodiments above-described except that Example 1 had an overcoat lacking beads, while Examples 2–4 had the following overcoats: Ex. 2: 10 micrometer beads dispersed in a polymeric binder coated at a rate of 0.64 grams/ft$^2$, Ex. 3: 10 micrometer beads dispersed in a polymeric binder coated at a rate of 0.46 grams/ft$^2$, and Ex. 4: 10 micrometer beads dispersed in a polymeric binder coated at a rate of 0.64 grams/ft$^2$. cassettes were rested on edge for 15 minutes after being loaded with film. The cassettes were then exposed by x-rays set to obtain densities of 0.75 to 0.90 on the fills. Luminescent layers of the intensifying screens varied in the different examples, but evaluated results normalized these differences. Air purge rates were found to be improved for the examples utilizing beads.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

cassette 10
tube side unit 12
cover unit 14
hinge 16
intensifying screen 18
pad 20
sheet 22
latch mechanism 24
rivets 25
film space 26
sidewalls of units 12,14: 28,29,30,31
light lock elements 32,33
film space ribs 34
partial ribs 35,36
backer plates 37
molding (tube side) 38
molding (cover) 40
insert 41
panel 42,44
flexible portion (of hinge) 46
first attachment portion (of hinge) 48,
t-shaped rail 49
second attachment portion (of hinge) 50.
channel 51
flange 52
channel 53
torsion box portion 54
periphery 56
pressure panel 58
buttresses 60
butress 60a
primary surface 62 (of pressure panel)
contact surface or slip-layer 64
resilient portion 66
non-slip edge 68
stop flange 70
corner pads 74
recess 76
window 78

What is claimed is:

1. A x-ray film cassette for use with radiographic film, said cassette comprising:

a tube side unit and a cover unit, said units defining a film space for said film, said units being relatively pivotable between an open state and a closed state, said tube side unit being substantially convex in at least one of length and width dimensions when said units are in said open state, said tube side unit being substantially flat in both length and width dimensions when said film is in said film space and said units are in said closed state;

said tube side unit including a compressible pad adjoining said film space;

said cover unit including a cover panel, a pressure panel, and an intensifying screen, said cover panel and said pressure panel being rigidly mounted in spaced parallel relation to form a torsion box having a rigidity greater than a summed rigidity of said cover and said panel, said intensifying screen being adhered directly to said pressure panel adjoining said film space;

said convexity of said tube side unit and said compressible pad being selected to impose on said film, in said closed state, a substantially uniform compressive force of from about 0.09 psi to about 0.35 psi.

2. The x-ray film cassette of claim 1 wherein said film, in said closed state is subject to a substantially uniform compressive force of about 0.20 psi.

3. The x-ray film cassette of claim 1 wherein said cassette has a substantially uniform screen-film separation of less than about 12.5 micrometers when said tube side and cover units are in said closed state and said film is in said film space.

4. The x-ray film cassette of claim 1 wherein said intensifying screen includes a beaded layer having a plurality of at least substantially rigid beads dispersed in and predominantly protruding from a polymeric matrix.

5. The x-ray film cassette of claim 4 wherein said beads define microchannels between said matrix and said film when said units are in said closed state and said film is in said film space.

6. The x-ray film cassette of claim 5 wherein said cassette has an air purge time of less than about 5 minutes.

7. The x-ray film cassette of claim 6 wherein said beads have a median diameter of from about 10 micrometers to about 20 micrometers.

8. The x-ray film cassette of claim 6 wherein said beads having a median diameter of about 10 micrometers.

9. The x-ray film cassette of claim 6 wherein said matrix has a median thickness of from about 3 micrometers to about 10 micrometers.

10. The x-ray film cassette of claim 6 wherein said beads have a median diameter of about 13 to about 17 micrometers, and said matrix has a median thickness of from about 5 micrometers to about 8 micrometers.

11. The x-ray film cassette of claim 1 wherein said compressible pad has a contact surface adjoining said film space, said contact surface having a coefficient of friction relative to said film of less than about 0.35.

12. The x-ray film cassette of claim 1 wherein said compressible pad and said intensifying screen each have a contact surface adjoining said film space, said contact surface each having about the same coefficient of friction relative to said film, said intensifying screen having a non-slip edge adjoining said contact surface of said compressible pad, said non-slip edge having a coefficient of friction relative to said film in excess of the coefficients of friction of said contact surfaces.

13. The x-ray film cassette of claim 12 wherein said intensifying screen is adhered to said pressure panel by an adhesive layer having a thickness of from 0.1 mm to about 0.1 mm.

14. The x-ray film cassette of claim 1 wherein said tube side unit is substantially convex in both length and width dimensions.

15. The x-ray film cassette of claim 1 wherein said units each having a periphery and a film portion, said film portions defining said film space, said peripheries interdigitating to form a light lock when said units are in said closed state.

16. The x-ray film cassette of claim 15 wherein said film portion of said tube side unit has a central section and a distal section, said distal section adjoining said periphery of said tube side unit, said distal section having a lesser thickness than said central section, to increase local curvature of said distal section relative to the local curvature of said central section.

17. The x-ray film cassette of claim 1 wherein said cover unit further comprises an adhesive layer between said intensifying screen and said cover panel, said adhesive layer having a thickness of from about 0.1 mm to about 0.50 mm.

* * * * *

UNITED STATES PATENT AND TRADEMARK OFFICE
CERTIFICATE OF CORRECTION

PATENT NO. : 5,652,781
DATED : July 29, 1997
INVENTOR(S) : Randy Armbruster

It is certified that error appears in the above-indentified patent and that said Letters Patent is hereby corrected as shown below:

In The Abstract: In the first sentence after x-ray, delete "fill" and insert "film".

Signed and Sealed this

Twenty-eighth Day of October, 1997

Attest:

BRUCE LEHMAN

Attesting Officer        Commissioner of Patents and Trademarks